US006879582B1

(12) United States Patent
Dhara et al.

(10) Patent No.: US 6,879,582 B1
(45) Date of Patent: Apr. 12, 2005

(54) MEDIA TERMINAL ADAPTER-CELLULAR TRANSCEIVER (MTA-CT)

(75) Inventors: Krishna Kishore Dhara, Aberdeen, NJ (US); Madhav Moganti, Perth Amboy, NJ (US); Anish Sankalia, Iselin, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 794 days.

(21) Appl. No.: 09/677,054

(22) Filed: Sep. 29, 2000

(51) Int. Cl.⁷ .............................................. H04L 12/66
(52) U.S. Cl. ..................... 370/352; 370/329; 370/465
(58) Field of Search ............................. 370/352, 229, 370/230, 231, 355, 356, 385, 392, 410, 465, 466, 467, 522, 524, 328, 329; 379/220.01, 221.01, 221.04

(56) References Cited

U.S. PATENT DOCUMENTS

| 6,208,627 B1 | * | 3/2001 | Menon et al. ............... 370/328 |
| 6,327,352 B1 | * | 12/2001 | Betts et al. .................. 379/189 |
| 6,466,651 B1 | * | 10/2002 | Dailey ........................... 379/37 |
| 6,584,184 B1 | * | 6/2003 | Nabkel et al. .......... 379/201.01 |
| 6,625,451 B1 | * | 9/2003 | La Medica et al. ......... 455/434 |
| 6,643,356 B1 | * | 11/2003 | Hickey et al. ............ 379/88.12 |
| 6,643,566 B1 | * | 11/2003 | Lehr et al. .................. 700/286 |
| 6,704,327 B1 | * | 3/2004 | Gardner et al. ............. 370/467 |

* cited by examiner

*Primary Examiner*—Brian Nguyen

(57) ABSTRACT

An apparatus for providing bifurcated voice and signaling traffic over a cable telephony architecture by segregating signaling traffic and voice traffic and transmitting the respective traffic over two different mediums to a switch to establish a phone call.

22 Claims, 4 Drawing Sheets

MEDIA TERMINAL ADAPTER-CELLULAR TRANSCEIVER (MTA-CT)

TECHNICAL FIELD

The invention relates to the field of communications systems and, more particularly, to an apparatus for providing bifurcated signaling and bearer traffic over a cable telephony network.

DESCRIPTION OF THE BACKGROUND ART

A cable telephony network allows voice to be transported over the Public Switch Telephone Network (PSTN) or using a Packetized Voice mechanism such as Voice over Internet Protocol (VoIP) for voice to be transported over an Internet Protocol (IP) network.

Cable companies have an installed base of equipment, which is primarily directed to the transport of video not voice and data. To provide voice over their infrastructure, cable companies must adapt their networks to accept voice at a great economical expense. Compounding the problem is that the transport of voice is very bandwidth intensive due to, for example, transport overhead. For example, to transport a 64 kilobit per second voice call, in certain circumstances, may require more than 140 kilobits per second of IP traffic. Also, the Cable companies require a Quality of Service (QoS) enabled network and a high processing capacity gateway to support VoIP telephony.

Current Host Digital Terminal (HDT) based voice over cable telephony architectures do not have the required end to end bandwidth to support traditional voice processing without the potential of producing signal degradation. Also, existing Packet Cable based voice over cable telephony architectures do not have the required end to end bandwidth to support traditional voice processing without the potential of producing high network delays. Additionally, the transport of voice traffic and signaling information lead to bottlenecks within the infrastructure of the cable telephony network.

SUMMARY OF THE INVENTION

The invention comprises an apparatus for providing bifurcated voice and signaling traffic utilizing a suggested hybrid fiber coaxial (HFC)/wireless access architecture. The invention advantageously provides efficient, end-to-end communication by reducing bottlenecks within the infrastructure of the existing cable network. Additionally, signal degradation and delays are reduced.

Specifically, an apparatus for providing bifurcated voice and signaling data over a network, comprising: a memory, for storing protocols for interfacing with the network; and a processor, coupled to said memory, for segregating signaling traffic and related voice traffic including information useful in establishing a communications link, for transporting said voice traffic between a calling party and called party, and for transmitting said voice traffic and said signaling traffic via different communication channels.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

The invention will be described within the context of three subscribers (A, B and C) communicating via respective telephony technologies. It should be noted that the present invention is compatible with different telephony technologies (i.e. Voice over Internet Protocol VoIP, Voice over Digital Subscriber Loop (VoDSL), Fiber to the Home (FTTH) and the like). The benefits of the invention can be gained even if a respective subscriber uses an alternate technology.

It should be appreciated by those skilled in the art that the voice application presented here can be replaced with any multi-media application.

Figure 1:
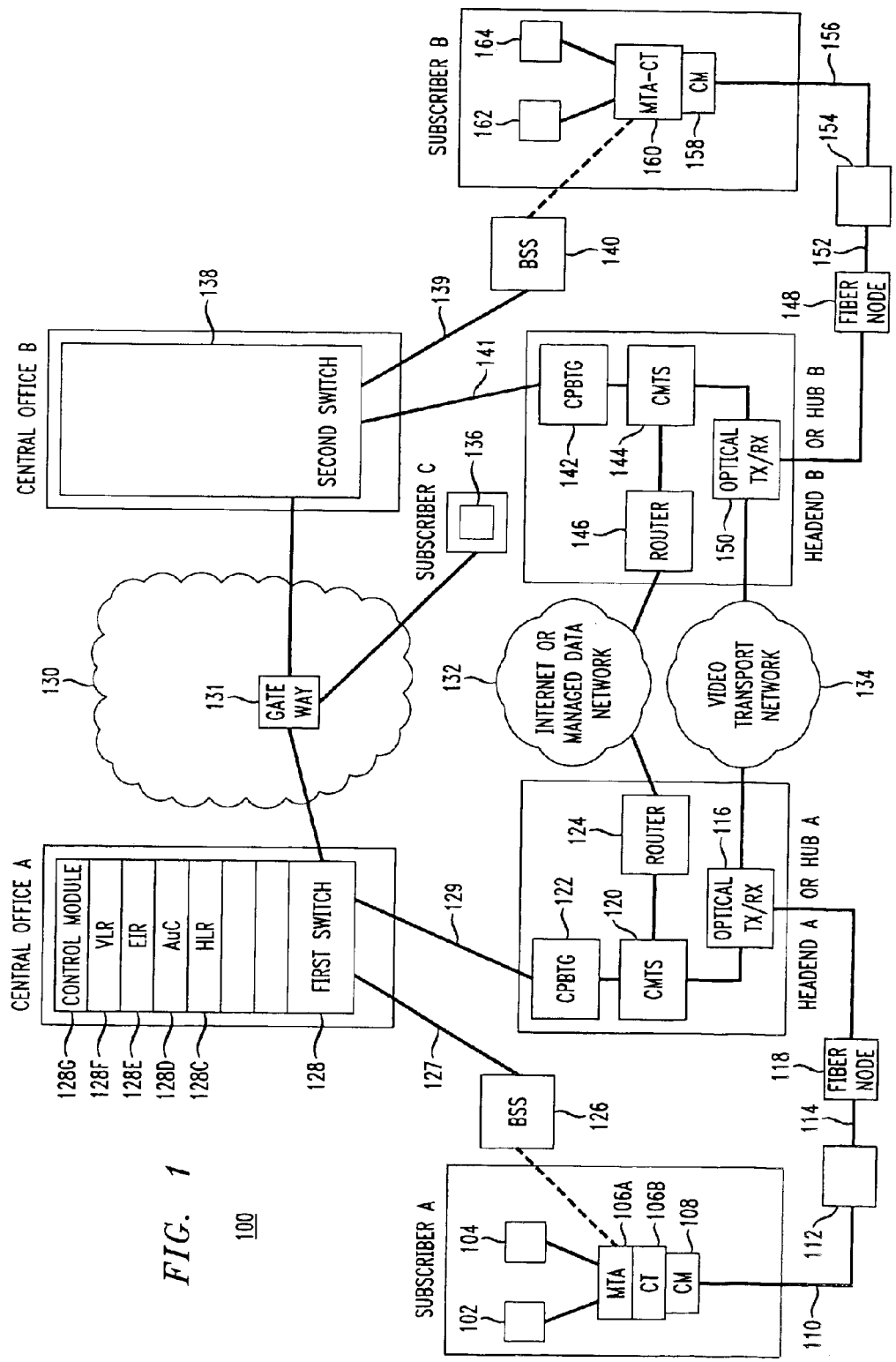
FIG. 1 depicts a high level block diagram of a communications system including the present invention.

FIG. 1 depicts a high level block diagram of a communications system including the present invention. Specifically, the system 100 of FIG. 1 comprises at subscriber A a first computer terminal 102 and a first telephone device 104, both coupled to a first multi-media terminal adapter and cellular transceiver (MTA-CT) 106. First MTA-CT comprises a MTA 106A and a cellular transceiver (CT) 106B. Coupled to first MTA-CT 106 is a first cable modem 108. A first fiber coaxial coupler 112 is connected to the first cable modem 108 via a transmission medium 110.

It should be appreciated by those skilled in the art that first MTA-CT 106 may be integrated into first cable modem 108.

At a cable Headend A or a Hub A, a first optical transceiver 116 is coupled to first fiber node 118. The first fiber node 118 is connected to first fiber coaxial coupler 112 via transmission medium 114. Second transmission medium 114 comprises, for example, a fiber optic cable. First optical transceiver 116 is coupled to a video transport network 134. The video transport network 134 supports the distribution of video and audio signals such as movies to headend offices and to subscribers.

First optical transceiver 116 is also coupled to a first Cable Modem Termination System (CMTS) 120. First CMTS 120, is coupled to a first router 124 which is, in turn, coupled to an internet protocol (IP) network 132. IP network 132 provides interchange of transport data to a second cable headend or Hub. It will be appreciated by those skilled in the art that IP network 132 can be replaced with a data network adhering to a non-IP protocol.

First CMTS 120 is also coupled to a first Circuit Packet Bearer Traffic Gateway (CPBTG) 122. First CPBTG 122 is coupled to a first switch 128, illustratively a class 5 Wireless switch which is also known as a Mobile Switching Center (MSC), via a T1 trunk 129. T1 trunk 129 comprises, illustratively, twenty four Digital Signal Level Zero (DS0) channels.

It should be appreciated by those skilled in the art that first switch 128 may be a voice switch with a wireless interface and that CPBTG 122 may also be integrated into the switch.

First switch 128 is coupled to a first base station system 126 via a second T1 trunk. First switch 128 includes a control module or controller 128G, a wireless global switch module 128B which allows a wireless switch module 128A to communicate with first BSS 126, a Visitor Location Register (VLR) 128F for storing the Equipment Identifier Numbers (EIN) 128E of cellular units from outside the serving area making calls within a local calling area; a Home Location Register (HLR) 128C database which stores the EINs of cellular phones from the local serving area; Equipment Identifier Register (EIR) 128E database for storing EINs of phones allowed to make calls; and Authentication Center (AuC) 128D database performs mathematical computations to verify the authenticy of the cell phone's identity.

It will be appreciated by those skilled in the art that VLR 128F, HLR 128C, EIR 128E, and AuC 128D databases may be stored externally from first switch 128.

First base station system 126 is coupled to first MTA-CT 106 via a radio frequency (RF) link. First switch 128 is also coupled to the Public Switch Telephone Network (PSTN) 130. PSTN 130 supports communication between first switch 128 and a second switch 138 at central office B (which is local to subscriber B). Included in PSTN 130 is a gateway switch 131 for routing calls between local serving switches, for example, first switch 128 and second switch 138. A third telephone, at subscriber C, is coupled to gateway switch 131.

Second switch 138 is coupled to a second BSS 140 via a third T1 trunk 139. Second BSS 140 is coupled to a second MTA-CT 160, located at subscriber B, via a second radio frequency link. Second MTA-CT 160 is coupled to a second telephone 162 and a second computer 164. Second MTA-CT 160 is also coupled to cable modem 158. A second fiber coaxial coupler 154 is coupled to second cable modem 158 via transmission medium 156 for example, a coaxial cable.

At cable Headend B or Hub B a second optical transceiver 150 receives video from video transport network 134. A second fiber node 148 is coupled to second optical transceiver 150. Second fiber node 148 is coupled to second fiber coaxial coupler 154 via a transmission medium 152 such as coaxial cable. Second optical transceiver 150 is also coupled to a second CMTS 144. CMTS is coupled to a second router 146 which receives and transmits data information to and from the IP network 132. Second CMTS 144 is also coupled to a second CPBTG 142. Second CPBTG 142 is also coupled to second switch 138 via a fourth trunk 141.

In the case of a voice communication from subscriber A to subscriber B, the first MTA-CT 106 detects an "off hook" condition from first telephone 104 and communicates with first BSS 126 via a radio frequency link. First BSS 126 establishes a signaling path with first switch 128 via a DS0 channel on T1 trunk 127. Signaling between first BSS 126 and first switch 12B can be done using, for example, Signaling System 7 (SS7) protocol.

Once a signaling path is established between first BSS 126 and first switch 128, first BSS 126 notifies first MTA-CT 106 that the signaling path is established. First MTA-CT 106, responsively communicates signaling messages to first switch 128. Once signaling messages are established and the called party picks up the second telephone 162, the voice traffic flows from telephone 104 to first MTA-CT 106 in digitized form to first cable modem 108. The voice signal is then communicated to first CMTS 120. First cable modem 108 and first CMTS 120 utilize Data Over Cable System Interface Specification (DOCSIS) protocol to communicate data packet data between the respective devices. The bandwidth DOCSIS provides primarily depends upon channel radio frequency (RF) bandwidth, symbol rate, and modulation techniques used.

It will be appreciated by those skilled in the art that first MTA-CT 106 will transmit voice in compressed form via first cable modem 108 based upon the wireless technology used. Since first switch 128 is a wireless switch, wireless voice compression techniques can be utilized between first MTA-CT 106 and first switch 128. In case local power is lost to first MTA-CT 106, the voice traffic is transmitted over the wireless network.

Further data compression can be achieved via the use of DOCSIS and Internet Protocol (IP)/User Datagram Protocol (UDP)/Real-time Transport Protocol (RTP) header compression.

It will be appreciated by those skilled in the art that other communication protocols other than DOCSIS may be substituted.

First CMTS 120 then communicates voice signals to first CPBTG 122 where the voice signal is depacketized and communicated to first switch 128 in circuit form rather than packet form. Specifically, CPBTG 122 converts voice path setup and packet to circuit conversions and vice versa as opposed to present devices which only perform Network Based Call Signaling (NCS) and voice path setup. Illustratively, a product such as the Packet Star Access Concentrator model 1250(PSAX 1250) manufactured by Lucent Technologies, Inc of Murray Hill, N.J. could be used with minor modifications as CPBTG 122.

First switch 128 then communicates the voice traffic to PSTN 130 where it is then communicated to second switch 138. Based on a called party number, second switch 138 determines that a call is going to a cable modem customer, and initiates communication with second BSS 140 where a signaling path is established between second switch 138 and second BSS 140. BSS 140, in turn, initiates a signaling path with second MTA-CT 160. Second MTA-CT 160 receives the signaling information and detects a ringing condition from subscriber A. In turn, MTA-CT 160 rings second telephone 162.

Once subscriber B picks up second telephone 162, this signaling information is conveyed back to first MTA-CT 106, and a voice path is established between first MTA-CT 106 and second MTA-CT 160 whereby voice traffic is communicated between first MTA-CT 106 to second MTA-CT 160 via the route first MTA-CT 106 to first cable modem 108 to first CMTS 120 to first CPBTG 122 to first switch 128 over public switch telephone network 130 to second switch 138 to second CPBTG 142 to second CMTS 144 to second cable modem 158 to second MTA-CT 160.

Figure 2:
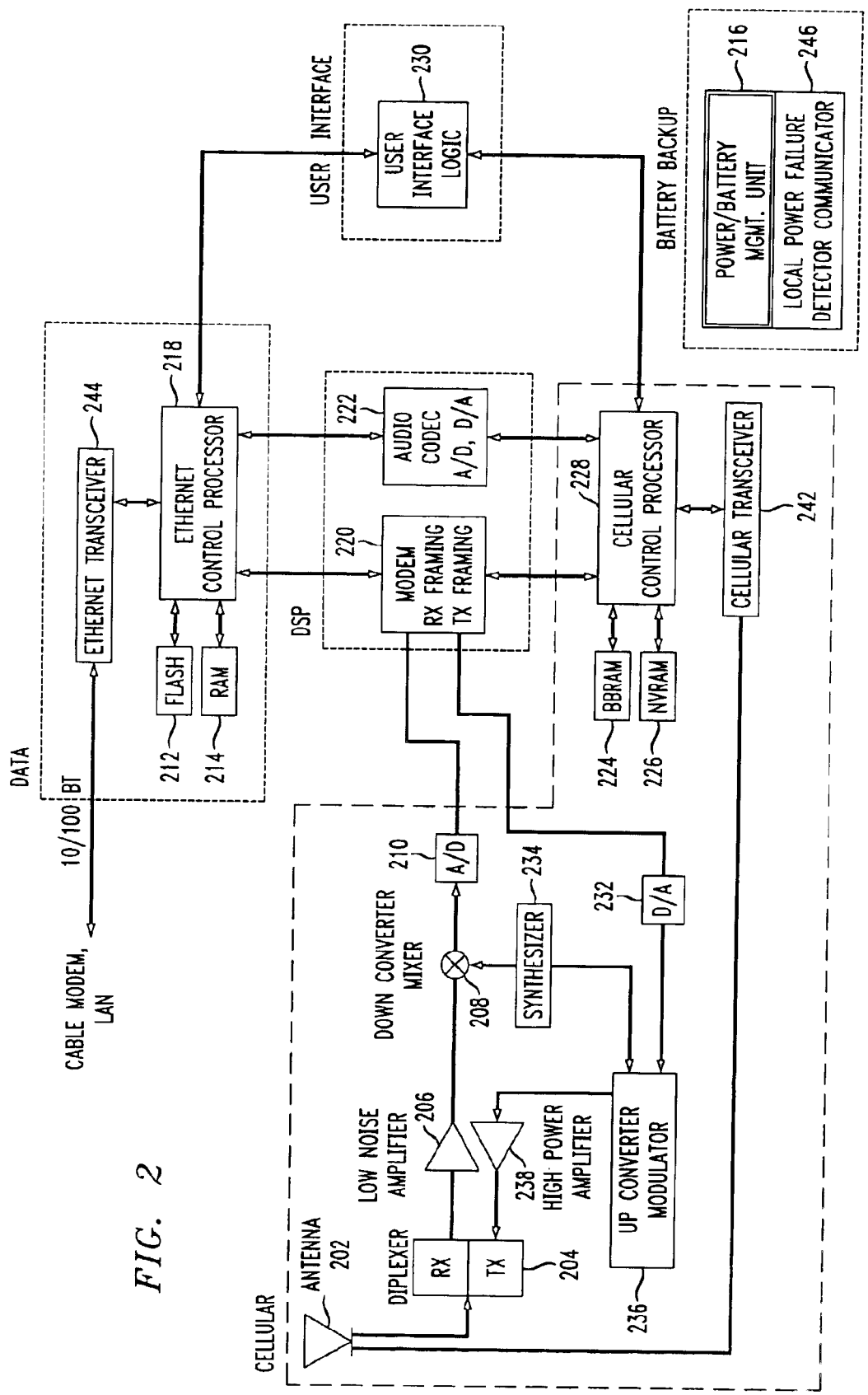
FIG. 2 depicts an integrated multi-media terminal adapter and cellular transceiver.

FIG. 2 depicts an integrated multi-media terminal adapter and cellular transceiver. Specifically, FIG. 2 depicts the MTA 106A and the cellular transceiver 106B discussed above with respect to the first MTA-CT of FIG. 1.

MTA-CT 106 comprises a Digital Signal Processing (DSP) portion, a cellular portion, a user interface portion, a battery back up portion and a data portion.

The DSP portion transmits, receives and processes signals from the data portion, the user interface portion and cellular portion of MTA-CT 106. The cellular portion communicates signaling messages with first BSS 126. The data portion of MTA-CT 106 communicates data information between MTA-CT 106 and first cable modem 108. The user interface portion communicates with the data portion and cellular portion as well as peripheral devices.

The user interface portion provides the user interface functions of a telephone and may include an interface jack interfacing with a telephone. For example, an RJ11 jack. Traditional interface devices can be a key pad for dialing numbers, an audible indicator for announcing calls, keys such as mute, redial, hold, transfer, conferencing, a display for displaying user prompts, number dialed, Caller ID and the like. It should be noted that those skilled in the art may devise other devices that can be used with the present invention.

The data portion of the MTA-CT 106 comprises, illustratively, an Ethernet control processor 218 for processing data information from the DSP portion of the circuit and from the user interface portion of the circuit. Ethernet control processor 218 performs the voice processing, call processing, and network management software functions of MTA-CT 106.

Random Access Memory (RAM) 214 is coupled to Ethernet control processor 218. Flash memory 212 is also coupled to Ethernet control processor 218 as well as Ethernet transceiver 244.

Ethernet transceiver 244 serves as an interface to data devices such as cable modem 108 or first computer terminal 102. In addition, ethernet transceiver 244 allows the transmission and reception of voice packets from/to an IP telephone. The interface to the ethernet transceiver 244 and an external device can be, for example an RJ45 jack.

Flash memory 212 allows easy upgradability of MTA-CT 106 since changes to standards or protocols can be reprogrammed in blocks instead of one byte at a time.

The cellular portion of MTA-CT 106 comprises an antenna 202 for transmitting or receiving radio signals. The preferred embodiment is a mechanical antenna due to its ability to dither at small intervals, and thus can maintain accurate signal tracking when used in conjunction with an angular position determinant. It will be appreciated by those skilled in the art that an electronic antenna may also be substituted for the mechanical antenna.

A cellular transceiver 242 comprising a radio frequency section (not shown) is coupled to antenna 202. Cellular control processor 228 is coupled to cellular transceiver 242 to process this cellular information and also communicate with the DSP portion and user interface portion of MTA-CT 106.

Coupled to cellular control processor 228 are a Non-Volatile Random Access Memory (NVRAM) 226 and a Battery Back up Random Access Memory (BBRAM) 224. NVRAM 226 provides memory retention when the power is off. Cellular control processor 228 together with NVRAM 226 and BBRAM 224 provide the overall executive control of the functions and interfaces of cellular transceiver 106B.

Antenna 202 is also coupled to a diplexer 204 having a receive portion and a transmit portion. A low noise amplifier 206 is coupled to the receive portion of diplexer 204. Low noise amplifier 206 amplifies the signal and communicates the signal to down converter mixer 208. Down converter mixer 208 takes the high frequency signal from low noise amplifier 206 and combines it with a signal from synthesizer 234 and creates an intermediate frequency range signal for further processing. This signal having the intermediate frequency range is communicated to analog-to-digital converter 210 and is further communicated to the DSP portion of MTA-CT 106.

The DSP portion of MTA-CT 106 communicates the signal to digital-to-analog converter 232 which, in turn, communicates the signal to up converter modulator 236. Up converter modulator 236 also receives a signal from synthesizer 234. Up converter modulator 236 takes the incoming signals and performs frequency translation in such a manner that the output frequency is higher than the input frequency. The output frequency is communicated to high power amplifier 238 which in turn communicates the signal to the transmit portion of diplexer 204. Diplexer 204 allows radio frequency signals to be received and transmitted simultaneously.

The DSP portion of MTA-CT 106 comprises a modem 220 and an audio coder 222. The modem 220 modulates and demodulates signals from the data portion and cellular portion of MTA-CT 106. Audio coder 222 interfaces various peripheral devices such as an ear phone, microphone, an RJ11 jack for connecting a telephone, and the like. Audio coder 222 provides a conversion of analog voice into digital samples and vice versa. It also communicates these signals to data portions and cellular portions of MTA-CT 106.

The power battery backup portion of MTA-CT 106 includes an uninterruptable power supply (UPS) 216 which converts household power to direct current power for MTA-CT 106. UPS 216 also provides battery backup to maintain MTA-CT 106 operation through local power outages. For phone service to be operational the phone must be capable of originating calls, ringing, and terminating calls. Coupled to UPS 216 is a local power failure detector and communicator 246. Local power failure detector communicator 246 detects an absence of local power and in turn communicates a signal to the head end office alerting personnel to the absence of local power.

It is assumed for the purposes of powering that first MTA-CT 106 is integrated into the first cable modem 108. Cable modem failure detection requirements can be found in document DOCSIS operation support system interface specification document number SP-OSSIv1. 1-D01991115.

It should be appreciated by those skilled in the art that if the first MTA-CT 106 is not integrated into first cable modem 108 then the UPS 216 and local power failure detector communicator 246 are supporting both first cable modem 108 and MTA-CT 106 independently.

It should also be noted that the processor portions of the circuit comprising Ethernet control processor 218, cellular control processor 228 and DSP portion of MTA-CT 106 are each described as performing separate functions, for example, voice processing, call processing, protocol processing, and network management software management functions of the telephone. This may consist of a digital signal processor for voice related functions, Ethernet control processor for controlling Ethernet functions and cellular control processor for controlling cellular transceiver functions. However, such functions can be integrated into a single processor.

Figure 3:
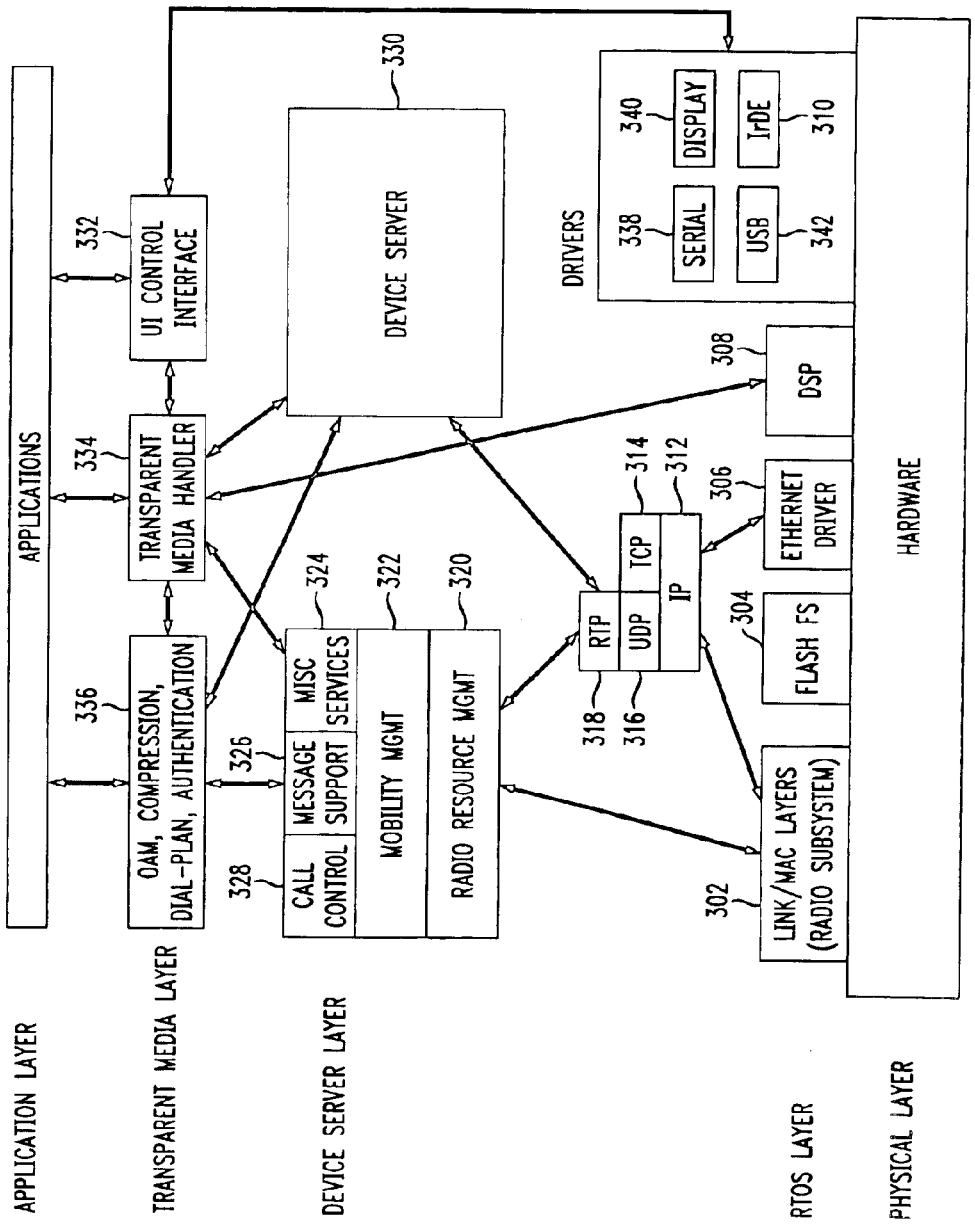
FIG. 3 depicts the software architecture of the MTA-CT for use in the communications system of FIG. 1.

FIG. 3 depicts the software architecture of the MTA-CT for use in the communications system of FIG. 1. Specifically, the software architecture 300 comprises four layers. Software architecture 300 allows a uniform interface for hiding MTA-CT 106 related protocols, and other hardware specific details. This abstracts and provides a uniform view of the underlying integrated system.

The real-time operating system (RTOS) interfaces the physical layer containing the hardware components of MTA-CT 106. The ROTS layer includes a link/media access control (MAC) 302 layer which controls access to the cellular system physical layer. The RTOS layer also provides standard interfaces such as flash memory interface 304, DSP interface 308, an infrared data association (IrDE) interface 310, a serial interface 338, a display interface 340, and a universal serial bus (USB) interface 342. Drivers such as the Ethernet driver 306 are also supported on the RTOS layer.

The RTOS layer also includes a data packet structure portion for implementation which includes an internet protocol (IP) 312 data structure for keeping track of internet addresses for different nodes, for routing outgoing messages and recognizing incoming messages. A "user datagram protocol" (UDP) 316 packet structure which transports packets and transmission control protocol (TCP) 314 packet structure are encapsulated in the IP 312 data structure. Real time transport protocol (RTP) 318 which supports a transport of real time data, for example like interactive voice or video is encapsulated in the UDP 316 packet structure. The data packet structure portion can be utilized by the link/MAC layer 302 and/or the Ethernet drivers 306.

The second layer, the device server layer, includes two different device servers, one for cellular transceiver 106B and one for MTA 106A. The cellular transceiver device server includes a radio resource management 320 component. Above the radio resource management 320 component is a mobility management 322 component. Call control component 328, message support component 326 and miscellaneous services component 324 are above mobility management component 322. Mobility management component 322, call control 328, message support 326 and miscellaneous services 324 are used in setting up of services between cellular transceiver 106B and the first base station system 126. The cellular transceiver device server is used to set up and tear down calls, and to support messaging and other advanced services. Additionally, cellular transceiver device server interfaces with the link/MAC layer 302 and the data packet structure portion.

The second device server of the device server layer applies to MTA 106A. Device server 330 handles all the registration, management, signaling and other services required by MTA 106A and communicates with a call server at the cable hub. The call server at the cable hub determines specific properties of device server 330. MTA device server interfaces with the data packet structure portion. The third layer, the transparent media layer, provides a critical function of providing a seamless integration of cellular and cable functions in one unit such that MTA 106A and cellular transceiver 106B function as one unit. The transparent media layer includes a management component 336 which handles operations administration and maintenance (OAM), a transparent media handler 334 and a user interface control interface 332. OAM includes fault management, compression, dial plan, securities, authentication, and other services. The management component 336 interfaces with the cellular transceiver device server and MTA device server 330 and transparent media handler 334.

Transparent media handler 334 manages the functions of MTA-CT 106 before, during, and after the call set up and the media transfer and determines the medium through which data and signaling is transmitted. The transparent media handler 334 can also be used to negotiate CODEX, select different compression techniques, mix data streams, perform authentication, and various other features such as using resources, such as new compression techniques, dial plan, and the like, from the device server 330 in cellular transceiver stack device server and vice versa. Transparent media handler 334 interfaces the cellular transceiver stack, device server 330 and user interface control interface 332 and distal signal processor interface 308.

The user interface control interface 332 interfaces with serial interface 338, USB interface 342, display interface 340 and transparent media handler component 334.

The fourth layer, the application layer, is above the transparent media layer and interfaces with the device server layer. The application layer allows rapid development of applications for the MTA-CT 106 through the application programming interface (API) provided by the transparent media layer component 334. The APIs and the separation of details from the device server layer by the transparent media layer provide the necessary abstraction for new applications to take advantage of unique interface of the MTA-CT 106.

Signaling is normally done through cellular transceiver 106B and data is transmitted through MTA 106A in the RTOS layer. However, if management component 336 detects that the MTA's 106A link is down, then the transparent media layer 334 switches to transmitting the data through the cellular transceiver 106B. This switching is done without the knowledge of the application layer above. That is, the application layer does not need to care about the switch from transmitting data through MTA 106A to transmitting data to CT 106B. The transparent media handler component 334 allows the application layer control over starting, stopping and other features of media streams without providing the application layer any control over the transmission medium.

Figure 4:
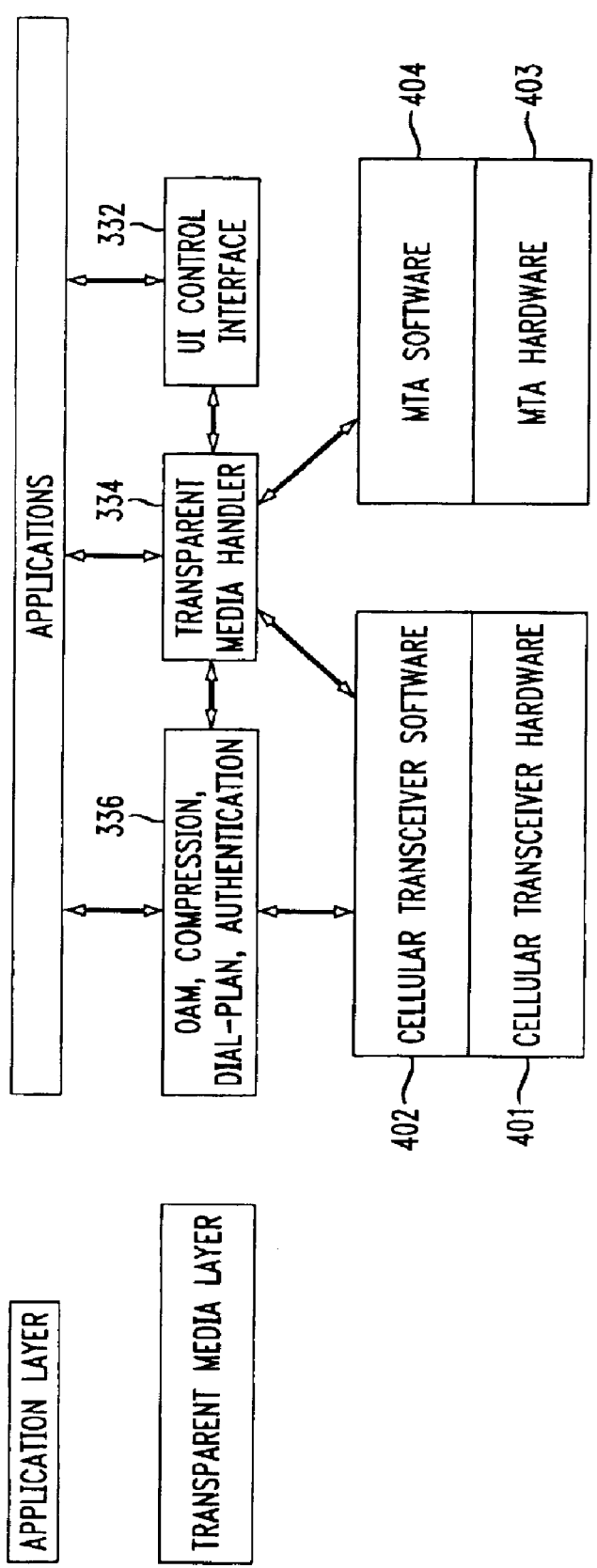
FIG. 4 depicts the software architecture for a nonintegrated MTA and CT.

FIG. 4 depicts the software architecture for a nonintegrated MTA and CT. Specifically, MTA-CT 106 comprises an MTA 106A that is off the shelf and a cellular transceiver 106B that is off the shelf. The application layer and transparent media layer of FIG. 3 remain the same. More specifically, FIG. 4 depicts a cellular transceiver hardware component 401 with a cellular transceiver software component 402 above it. Cellular transceiver software 402 interfaces with a management layer 336 and transparent media handler component 334. MTA hardware component 403 is below MTA software component 404. MTA software component 404 interfaces with transparent media handler 334. Functionally, the MTA 106 of FIG. 4 operates similarly to the MTA 106 of FIG. 3. Only the layer below the transparent media layer is changed and the interaction between the transparent media layer and the layer below, protocols and RTOS layers has changed.

Although various embodiments which incorporate the teachings of the present invention have been shown and described in detail herein, those skilled in the art can readily devise many other varied embodiments that still incorporate these teachings. As such, the appropriate scope of the invention is to be determined according to the claims which follow herewith.

What is claimed is:

1. An apparatus for providing bifurcated voice and signaling data over a network, comprising:
   a memory, for storing protocols for interfacing with the network; and
   a processor, coupled to said memory, for segregating signaling traffic and related voice traffic including information useful in establishing a communications link, for transporting said voice traffic between a calling party and called party, and for transmitting said voice traffic and said signaling traffic via different communication channels, wherein said voice traffic is switched to the same communication channel as said signaling traffic in the case of a loss of local power.

2. The apparatus of claim 1, wherein one of said communication channels is a data packet network.

3. The apparatus of claim 2, wherein said voice traffic is carried by said data packet network.

4. The apparatus of claim 3, wherein said voice traffic is subject to compression processing compatible with said data packet network.

5. The apparatus of claim 1, wherein one of said communication channels is a wireless network.

6. The apparatus of claim 5, wherein said signaling traffic is carried by said wireless network.

7. The apparatus of claim 1, wherein said apparatus comprises a Media Terminal Adapter-Cellular Transceiver (MTA-T) having integrated MTA and CT portions.

8. The apparatus of claim 1, wherein said apparatus comprises a Media Terminal Adapter-Cellular Transceiver (MTA-CT) having non-integrated MTA and CT portions.

9. An apparatus for providing bifurcated voice and signaling data over a network, comprising:

a memory, for storing protocols for Interfacing with the network; and a processor, coupled to the memory, for identifying a call request, for establishing a signaling link for transporting signaling traffic to a switch via a first transport medium, and for establishing a voice path for transporting voice traffic to the switch via a second transport medium responsive to a determination that a called party answers, wherein said voice traffic is switched to the same medium as said signaling traffic in the case of a loss of local power.

10. The apparatus of claim 9, wherein the first medium is a wireless medium.

11. The apparatus of claim 10, wherein said signaling traffic is carried by said wireless medium.

12. The apparatus of claim 9, wherein said second medium is a data packet network.

13. The apparatus of claim 12, wherein said voice traffic is carried by said data packet network.

14. The apparatus of claim 13, wherein said voice traffic is subject to compression processing compatible with said data packet network.

15. The apparatus of claim 9, wherein said apparatus comprises a Media Terminal Adapter-Cellular Transceiver (MTA-CT) having integrated MTA and CT portions.

16. The apparatus of claim 9, wherein said apparatus comprises a Media Terminal Adapter-Cellular Transceiver (MTA-CT) having non-integrated MTA and CT portions.

17. An apparatus for providing bifurcated voice and signaling data traffic over a network, the apparatus comprising:

a data portion, for interfacing with a data network;

a cellular portion, coupled to the data portion, for interfacing with a wireless network;

a user interlace portion, coupled to the data portion and cellular portion, for interfacing with peripheral devices;

a Digital Signal Processing portion, coupled to the cellular portion and the data portion, for processing cellular and data information wherein the cellular information comprising the signaling traffic and the data information comprising the voice traffic; and a battery backup portion, coupled to the digital signal processing portion, for detecting power failures, wherein upon the detection of a power failure, voice traffic is switched to a communication channel of said signaling traffic.

18. The apparatus of claim 17, wherein said data portion comprises at least one of a flash memory:

a random access memory;

an ethernet control processor; and an ethernet transceiver.

19. The apparatus of claim 17, wherein said cellular portion comprises at least one of:

a cellular control processor;

a cellular transceiver; and a memory device.

20. The apparatus of claim 19, wherein said memory device comprises at least one of:

a Battery Back up Random Access Memory (BBRAM); and a Non-Volatile Random Access Memory (NVRAM).

21. The apparatus of claim 20, wherein said battery back up portion comprises:

a power failure detector.

22. The apparatus of claim 17, wherein said digital signal processing portion comprises at least one of a modem; and a Coder/Decoder (CODEC).

* * * * *